UNITED STATES PATENT OFFICE.

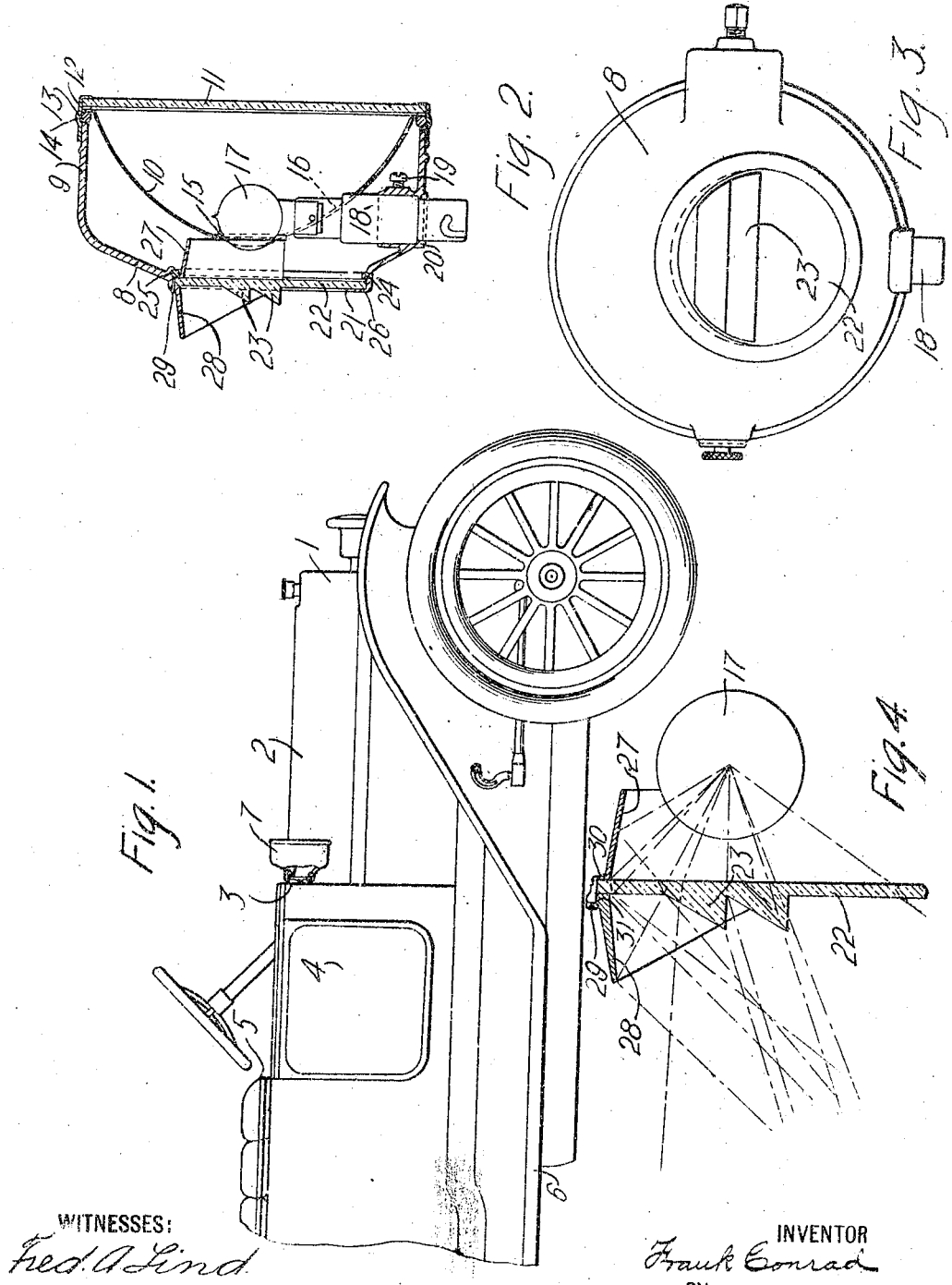

FRANK CONRAD, OF PITTSBURGH, PENNSYLVANIA, ASSIGNOR TO WESTINGHOUSE ELECTRIC AND MANUFACTURING COMPANY, A CORPORATION OF PENNSYLVANIA.

SIDE LAMP FOR AUTOMOBILES.

1,296,482.   Specification of Letters Patent.   Patented Mar. 4, 1919.

Application filed December 26, 1913.  Serial No. 808,781.

*To all whom it may concern:*

Be it known that I, FRANK CONRAD, a citizen of the United States, and a resident of Pittsburgh, in the county of Allegheny and State of Pennsylvania, have invented a new and useful Improvement in Side Lamps for Automobiles, of which the following is a specification.

My invention relates to side lamps for automobiles, and it has for its object to provide a simple and convenient means for lighting certain portions of such vehicles.

In the operation of motor vehicles at night over roads or streets that are poorly lighted or are in darkness, it is often a matter of inconvenience in operating and repairing the vehicle, as well as in entering and alighting from it, that the sides of the vehicle and the adjacent roadway are not sufficiently illumined.

I have provided a side lamp having a reflector located in the rear portion of the lamp structure which operates to illumine the sides of the vehicle, including the running board and in addition, a portion of the adjacent roadway. The lamp is so constructed that the light thus given out does not affect the vision of the operator.

In the accompanying drawings, Figure 1 is a side view, in elevation, of a portion of an automobile with my invention attached thereto. Fig. 2 is a side view, in section, of a lamp constructed in accordance with my invention. Fig. 3 is a rear view, in elevation, of the lamp of Fig. 2. Fig. 4 is a diagrammatic view illustrating a portion of the lamp and its effect upon a portion of the light rays transmitted by it.

Referring particularly to Fig. 1, an automobile 1 comprises the usual engine hood 2, dashboard 3, fore door 4, driver's seat 5 and running board 6. Side lamps 7 are mounted upon the dashboard 3 at each side of the vehicle body, only one lamp being shown. The lamps 7 serve to illumine the forward portion of the vehicle and a small portion of the roadway in front of it. The lamps 7 also serve to illumine the sides of the vehicle, including the running board 6, and a portion of the roadway at the sides of the vehicle.

Referring now to Figs. 2 and 3, the side lamp 7 comprises a casing 8 having a body portion 9 that is of substantially cylindrical form. A reflector 10 of any suitable shape, such as a parabola in section, and a glass 11 are retained in position by a flanged sleeve 12 which clamps them against the edge of the casing 8. The sleeve 12 is retained by a raised portion 13 of the casing 8 that engages a corresponding groove 14 in the sleeve. The reflector 10 is provided with an axial opening 15 and a slot 16 that is indicated by dotted lines (Fig. 2), to receive, respectively, an incandescent lamp bulb 17 and a connector 18 for the lamp. The connector 18, which projects through a suitable opening in the casing 8, is rigidly retained in position by a suitable set screw 19 and a flange 20 that is integral with the casing 8.

The rear end of the lamp 7 is partially inclosed by the casing 8 which is provided with a circular opening 21. The center of the opening 21 is below the axis of the lamp in order that the greater portion of the light rays passing through the opening may have a downward direction. The opening is fitted with a glass 22 having two horizontally extending prisms 23 upon its outer surface to form, in effect, a lens. The glass 22 is retained in position by a flexible ring 24 which engages a groove 25 in the casing and by a flange 26 that is integral with the casing. Approximately the upper half of the opening is provided with curved reflectors 27 and 28 which are respectively within and without the casing 8 and on opposite sides of the glass 22. The reflectors 27 and 28 are retained in position by suitable screws 29 which draw together the respective flange portions 30 and 31 (Fig. 4). The reflectors 27 and 28 serve to direct the light rays from the bulb 17 downwardly and rearwardly. The reflector 28 serves also as a shield to prevent the rays of light from the bulb 17 from reaching the eyes of the operator.

The effect of the prisms 23 of the glass 22 and of the reflectors 27 and 28 upon the rays of light which are transmitted by the glass 22, is clearly illustrated in Fig. 4. The rays which strike the reflectors, are directed downwardly as shown while the rays passing through the prisms 23 are refracted downwardly. The rays which pass through that portion of the glass 22 which is below the prisms 22 have an angle to the horizontal sufficiently large to render deflecting means unnecessary.

The result is to thoroughly illumine the sides of the vehicle and thus enable the operator to readily attach or detach articles such as extra tires that may be carried or to manipulate the valves of prestolite tanks that are usually located on the running boards of the vehicles. Sufficient light is furnished to enable the operator to make ordinary repairs, such as changing tires. This result is obtained without the use of additional power or fixtures. These and other advantages will be apparent to those skilled in the art to which my invention appertains.

I claim as my invention:

1. The combination with a casing, and a source of light within the casing, of a reflector within said casing provided with an opening, a lens adjacent said opening and a second reflector adjacent said lens and without said casing.

2. The combination with a casing, a reflector within said casing that is provided with front and rear openings, and a source of light within said reflector, of a lens adjacent the rear opening, and additional reflectors adjacent said lens.

3. The combination with a casing, a reflector in said casing having a rear opening and a source of light within said reflector and adjacent said opening, of means for directing downwardly the light rays passing through said opening, said means comprising a glass prism and a reflector adjacent said prism.

In testimony whereof, I have hereunto subscribed my name this 19th day of Dec. 1913.

FRANK CONRAD.

Witnesses:
A. P. SUNNERGREN,
B. B. HINES.